United States Patent [19]

Caron

[11] Patent Number: 5,113,988
[45] Date of Patent: May 19, 1992

[54] CLUTCH THRUST BEARING COMPRISING MEANS FOR CONNECTION TO THE OPERATING MEMBER

[75] Inventor: Fabrice Caron, Montigny-le-Bretonneux, France

[73] Assignee: SKF France, Clamart Cedex, France

[21] Appl. No.: 705,951

[22] Filed: May 29, 1991

[30] Foreign Application Priority Data

Jun. 21, 1990 [FR] France ............................ 90 07802

[51] Int. Cl.$^5$ ............................................. F16D 23/14
[52] U.S. Cl. ................................. 192/98; 192/110 B
[58] Field of Search .................... 192/98, 110 B

[56] References Cited

U.S. PATENT DOCUMENTS

| 2,093,799 | 9/1937 | Bemis | 192/98 X |
|---|---|---|---|
| 2,145,538 | 1/1939 | Binder | 192/110 B |
| 3,277,988 | 10/1966 | Pitner | 192/110 B X |
| 3,416,637 | 12/1968 | Maurice | 192/98 |
| 3,913,714 | 10/1975 | Camp | 192/98 X |
| 3,967,710 | 7/1976 | Ernst et al. | 192/98 |
| 4,357,058 | 11/1982 | Sonnerat | 192/98 X |
| 4,403,685 | 9/1983 | Beccaris | 192/98 |
| 4,854,436 | 8/1989 | Lassiaz et al. | 192/98 |
| 4,947,976 | 8/1990 | Limbacher | 192/98 |

FOREIGN PATENT DOCUMENTS

| 0111204 | 6/1984 | European Pat. Off. . |
|---|---|---|
| 3810369 | 10/1989 | Fed. Rep. of Germany . |
| 2078122 | 11/1971 | France . |
| 2461157 | 11/1983 | France . |
| 2615257 | 11/1988 | France . |
| 927811 | 6/1963 | United Kingdom ............ 192/110 B |
| 2055436 | 3/1981 | United Kingdom . |
| 2073353 | 10/1981 | United Kingdom . |

Primary Examiner—Rodney H. Bonck
Attorney, Agent, or Firm—Beveridge, DeGrandi & Weilacher

[57] ABSTRACT

Clutch thrust bearing comprising a rolling bearing mounted on a guide bush equipped with a tubular part and with a radial flange which is engaged by the operating member which operates the thrust bearing. Snap-fastening members connect the operating member and the guide bush axially. The snap-fastening members include two metal retaining elements which are capable of being inserted and held by snap-fastening in a housing provided in the guide bush, each retaining element having a hook interacting with the operating member.

6 Claims, 4 Drawing Sheets

CLUTCH THRUST BEARING COMPRISING MEANS FOR CONNECTION TO THE OPERATING MEMBER

The subject of the present invention is a clutch thrust bearing comprising a rolling bearing mounted on a guide bush equipped with a tubular part and with a radial flange on which bears a member for operating the thrust bearing, and snap-fastening means for connecting the operating member and the guide bush axially.

French Patent Application 2,615,257 (SKF FRANCE) discloses a clutch thrust bearing comprising snap-fastening means consisting of hooks moulded in a single piece with the guide bush from synthetic material. It has been noted, however, that for certain applications these hooks are too fragile. This prior patent application provides, as an alternative, for the use of attached hooks forming part of an additional piece which hooks onto the radial flange of the guide bush. Such an embodiment is, however, complex and entails an increase in manufacturing costs.

The French Patent Application 2,461,157 (FERODO) for its part describes a clutch thrust bearing in which the connection to the operating member is effected by elastic gripping of studs integral with the operating member in individual metal clips. Such an embodiment, in addition to having a certain complexity in its mounting, in practice results in a risk of the operating member escaping in the event of excessively high axial forces.

The subject of the present invention is the production of a clutch thrust bearing in which the means for connection to the operating member are simple to produce and permit easy mounting, whilst at the same time ensuring a reliable and effective connection under all operating conditions.

The clutch thrust bearing according to the invention comprises a rolling bearing mounted on a guide bush equipped with a tubular part and a radial flange on which bears a member for operating the thrust bearing. Snap-fastening means are provided in order to connect the operating member and the guide bush axially. According to the invention, the snap-fastening means comprise two independent, metal retaining elements which are capable of being inserted and held by snap-fastening in a housing provided in the guide bush. Each retaining element has a hook which interacts with the operating member.

The guide bush advantageously comprises two mounting supports, each having a housing for the metal retaining element in question.

Each housing comprises a passage traversing the radial flange of the guide bush through which one end of the retaining element can pass. In addition, an abutment means is provided in each housing in order to limit the insertion of the retaining element into the housing.

Each housing likewise preferably comprises two slide channels for guiding and holding in place the retaining element when it is inserted into the housing.

Lastly, each housing can advantageously comprise a surface portion which is chamfered in order to facilitate the bending of the end of the metal retaining element when it is inserted and when its end passes through the radial flange.

In this way, the connection between the guide bush and the operating member is effected effectively and simply by the two metal retaining elements which are similar to clips and are both identical. Each retaining element is connected to the guide bush by simple snap-fastening, its positioning and its guidance being effected by virtue of the existence of the slide channels arranged in the abovementioned housings, and by coming into abutment inside these housings.

The housings are formed in the mounting supports which are in the form of protuberances, for example diametrically opposite, located on the rear face of the radial flange of the guide bush, in other words the face opposite the rolling bearing and situated on the operating member side.

The connection obtained in this way is effected by the action of the hooks of the retaining elements, without there being any need to modify the structure of the operating member which, moreover, bears on the radial flange of the guide bush.

Each metal retaining element preferably has a cross-shaped plane general shape with one axial arm carrying a hook in order to interact with the operating member, and one transverse arm, the main faces of which are capable of interacting with the slide channels of the housing of each mounting support. The edge furthermost, in the axial direction, from the hook for its part comes into contact with the abutment means when the retaining element is inserted into the housing.

At the opposite end of the hook, the axial arm advantageously has a fold or a similar shape permitting the snap-fastening onto the radial flange and capable of passing through the said radial flange by bending in the through-passage provided in each mounting support. The snap-fastening fold then hooks onto the inner face of the radial flange opposite the operating member when the edge of the transverse arm of the retaining element has come into contact with the abutment situated in the housing.

The mounting supports of the guide bush are advantageously made from synthetic material which is injection-moulded at the same time as the tubular part of the guide bush.

Each mounting support can furthermore comprise at least one guide surface for the lateral guidance of the operating member.

The mounting supports can be arranged radially in proximity to the tubular part of the guide bush or at other locations on the radial flange of the guide bush which are at a distance from the said tubular part. The mounting supports can thus be arranged in proximity to the outer periphery of the radial flange. In this case, the hooks of the retaining elements can point inwards.

The invention will be readily understood upon studying the detailed description of some embodiments which are given by way of examples which are in no way limiting and are illustrated by the attached drawings, in which.

Figure 1:
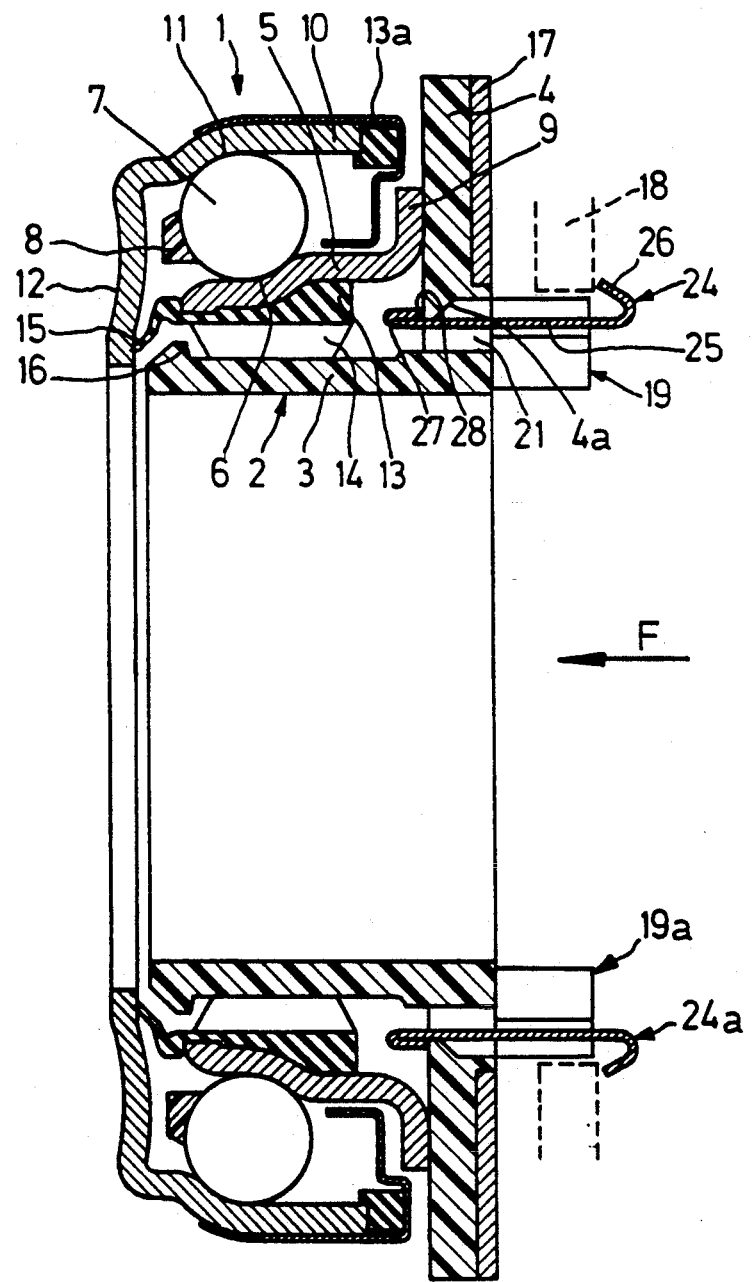
FIG. 1 illustrates a sectional view of a first embodiment of the invention.
Figure 2:
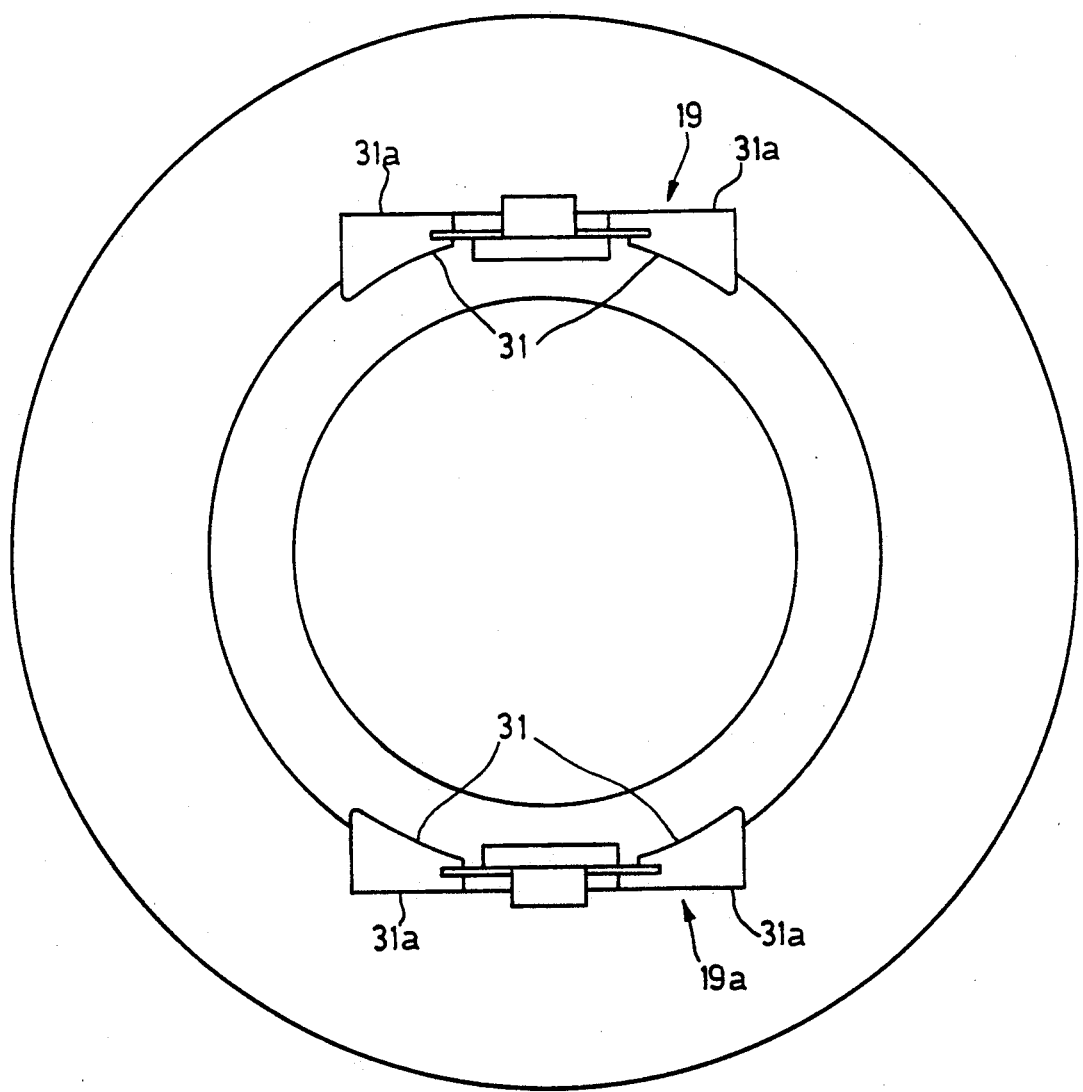
FIG. 2 is an external view, in the direction of the arrow F, of the clutch thrust bearing in FIG. 1.
Figure 3:
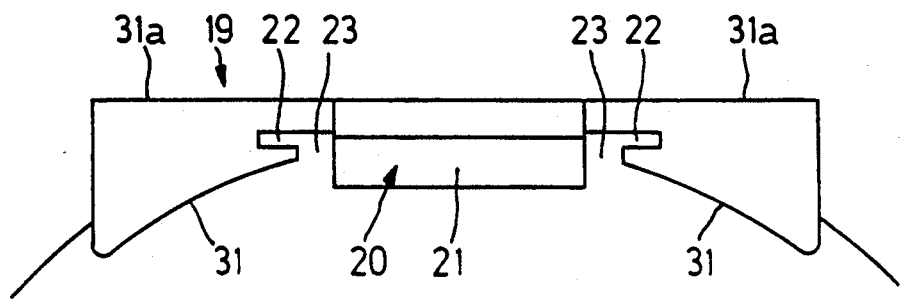
FIG. 3 is an enlarged view of a detail from FIG. 2 showing, in particular, one of the mounting supports.

As illustrated in FIGS. 1 to 3. the clutch thrust bearing according to the invention comprises a rolling bearing 1 mounted on a guide bush 2 which comprises a tubular portion 3 which can slide with respect to a guide tube (not shown in the FIGURE) and a radial flange 4. The rolling bearing 1 comprises an inner raceway 5 with a thin wall and produced by drawing of a metal sheet or of a tube, having a toroidal race 6 for a row of balls 7 which are held in a cage 8. The inner raceway 5 likewise comprises an extension pointing outwards and in the form of a radial flange 9 which comes into friction contact with the inner front surface of the radial flange 4. The rolling bearing 1 is completed by an outer raceway 10, likewise with a thin wall and produced by drawing of a metal sheet or of a tube, which has a toroidal race 11 for the balls 7 and a toroidal portion 12 which comes into contact with the surface of the diaphragm of a clutch device, not shown in the FIGURE, when the whole thrust bearing is displaced longitudinally with respect to the guide tube on which slides the guide bush 2. The rolling bearing 1 is protected by a protective plate 13a fixed to the outer raceway 10.

A sleeve made from resilient material 13, for example from an elastomer or from natural rubber, is arranged inside the inner raceway 5 and has a plurality of ribs 14 parallel to the axis of the thrust bearing and pointing inwards, and the inner free edge of which comes into contact with the outer surface of the cylindrical portion 3 of the guide bush 2 which is made from a rigid synthetic material, for example from a synthetic material to which mineral or similar fillers have been added.

The resilient sleeve 13 has an annular lip 15 which ensures the sealing of the rolling bearing 1 by coming into contact with the outer raceway 10. An annular rib 16 arranged at the end of the cylindrical portion 3 ensures that the bearing 1 is held in place on the guide bush 2 before mounting on the guide tube.

The radial flange 4 of the guide bush 2 has a metal ring 17 over which is moulded the said radial flange 4. This ring 17, which has preferably been subjected to a surface hardening treatment, serves as a contact surface for an operating member 18 shown in dashed lines in FIG. 1 and which exerts a force in the axial direction in order to cause the displacement of the thrust bearing as a whole during a clutch release operation.

The guide bush 2 comprises two mounting supports, referenced 19, 19a as a whole and arranged in a diametrically opposite manner, as can be seen in FIG. 2, projecting partly outwards, in other words away from the rolling bearing 1, as can be seen in FIG. 1.

As can be seen, in particular, on the enlarged view in FIG. 3, the mounting support 19 which is identical in all respects to the mounting support 19a has a housing 20 which comprises a through-passage 21 and two slide channels 22 placed on each side of the passage 21, being open at their outer front end, in other words on the operating member 18 side (FIG. 1). At their other end, the slide channels 22 are closed off by a solid wall defining an abutment 23.

The axial connection of the operating member 18 with respect to the guide bush 2 is effected according to the invention by means of two identical metal retaining elements 24, 24a which interact respectively with the mounting supports 19, 19a.

Figure 4:
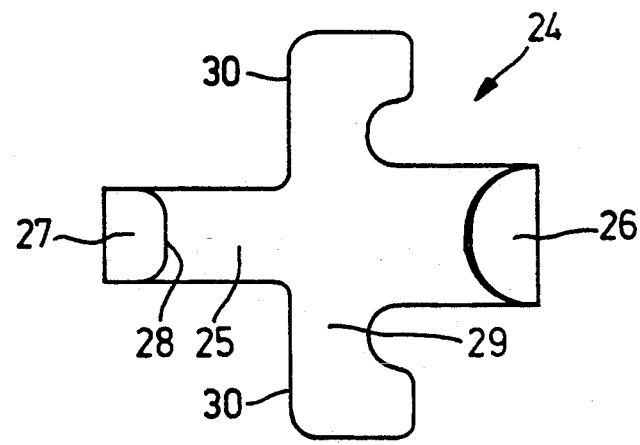
FIG. 4 is a plan view of one of the retaining elements which is used in the clutch thrust bearing illustrated in FIG. 1.

Referring to FIG. 4, it can be seen that the retaining element 24 has a cross-shaped general shape which can be obtained by stamping from a plane metal plate and subsequent forming. An axial arm 25 carries, at one of its ends, a hook 26 folded back at approximately 30° with respect to the plane of the arm 25. At its opposite end, the arm 25 has a fold 27, the edge 28 of which defines an abutment which interacts, as can be seen in FIG. 1, with the inner front face of the radial flange 4.

The retaining element 24 furthermore comprises a transverse arm 29, the dimensions and the thickness of which are such that it can penetrate into the slide channels 22 of the housing 20. The edge 30 of the transverse arm 29 is situated in such a position with respect to the edge 28 of the fold 27 that the said edge 28 is situated just outside the passage 21 when the edge 30 has come into abutment with the surface 23.

A metal retaining element 24 is particularly easy to instal and this takes place simply by pushing the said retaining element 24 axially after having introduced the transverse arm 29 into the slide channels 22, and the axial arm 25 into the passage 21. The passage 21 has sufficient dimensions in the radial direction to permit the bending of the axial arm 25 equipped with the fold 27, followed by the snap-fastening of the said fold 27 onto the rear face of the radial flange 4. The passage of the snap-fastening fold 27 is facilitated by the existence of a chamfered zone 4a of the radial flange 4 against which abuts the end of the fold 27 when the retaining element 24 is introduced.

The mounting of the operating member 18 likewise takes place by axial pressure, causing the hooks 26 of the two retaining elements 24, 24a to bend.

The inner faces 31 or outer faces 31a of the mounting pieces 19, 19a (FIGS. 2 and 3) likewise perform the role of lateral guide surfaces for the operating member 18.

In FIG. 1, the mounting pieces 19, 19a are placed in proximity to the tubular portion 3 of the guide bush 2. The passages 21 are therefore arranged substantially at the base of the radial flange 4. The hooks 26 point outwards.

Figure 5:
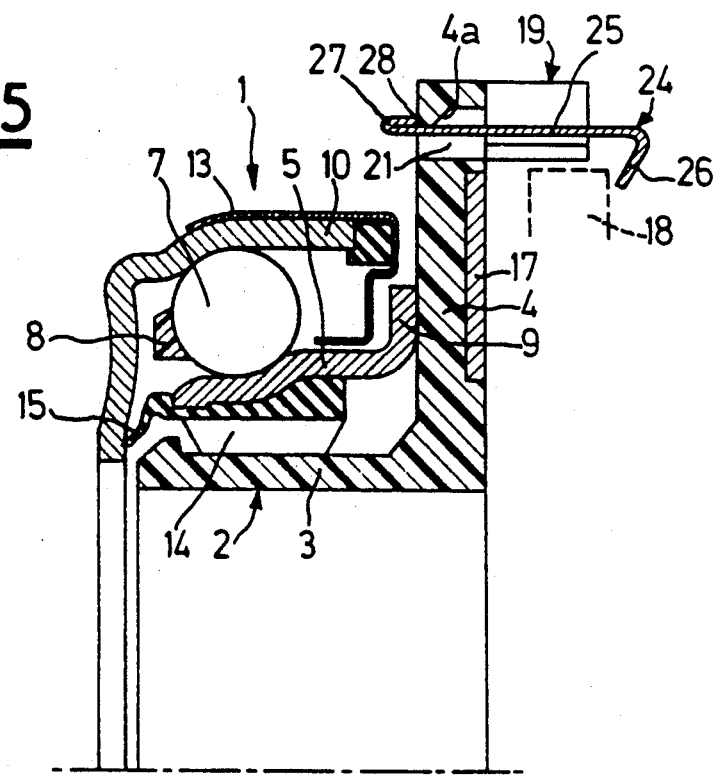
FIG. 5 is a view in partial section, similar to FIG. 1, of an alternative embodiment.

In the embodiment in FIG. 5 in which identical components carry the same reference numerals, the mounting pieces 19, 19a are, on the contrary, arranged on the radial flange 4 in proximity to the outer periphery of the latter. In this embodiment, the hooks 26 of the retaining pieces 24 this time point inwards. Apart from this difference, the structure of the pieces used is the same as in the preceding embodiment.

Figure 6:
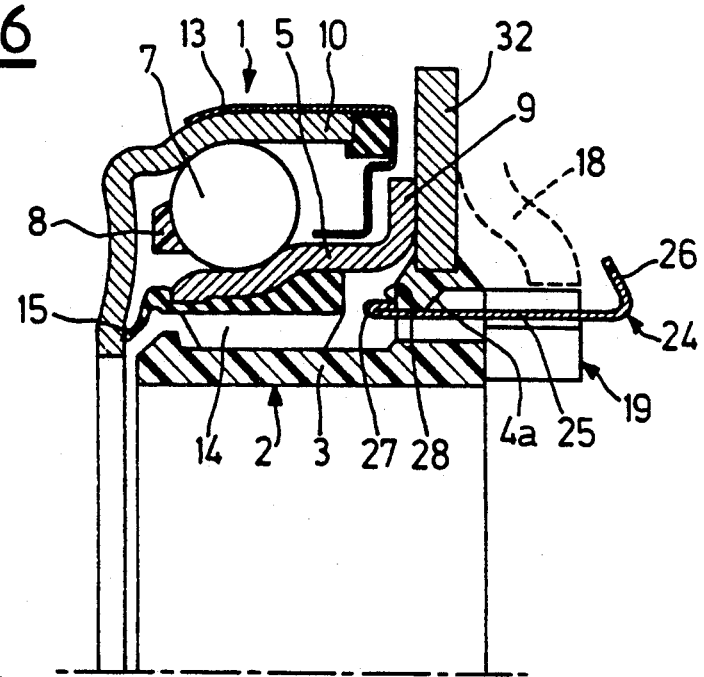
FIG. 6 is a view in partial section, similar to FIG. 1, of another alternative embodiment.

The particular structure of the guide bush 2 illustrated in FIGS. 1 and 5 is not essential for the present invention. By way of example of modification, FIG. 6 illustrates an alternative in which similar components carry the same reference numerals but in which the guide bush 2 has, in place of the radial flange 4 made from moulded synthetic material, an annular metal plate 32 over which the guide bush 2 made from synthetic material is moulded and then consists mainly of a tubular portion 3. The two front surfaces of the plate 32 serve respectively as a contact surface with the radial flange 9 of the inner raceway 5 of the bearing 1 and with the operating member 18.

Apart from this difference, the same mounting supports 19, 19a are to be found again in this alternative, arranged as in the embodiment in FIG. 1 in the vicinity of the tubular portion 3 of the guide bush 2. The retaining elements 24 used in this alternative are identical to those in FIG. 1.

I claim:
1. A clutch thrust bearing assembly comprising:
   a guide bush having a tubular part, a radial flange which is engageable by an operating member of the thrust bearing, and two mounting support means each provided with a housing having a passage;

a rolling bearing mounted on said guide bush;

two independent metal retaining elements adapted to be inserted in said passages and held by snap-fastening in said mounting support means;

each said retaining element having a cross-shaped plane general shape with one axial arm carrying a hook adapted to cooperate with said operating member and one transverse arm having two main surfaces and an edge portion furthermost in the axial direction from said hook;

each said housing including two slide channels cooperating with said main surfaces of the transverse arm of said retaining element, and an abutment means which is contacted by said edge portion to limit the insertion of the retaining element into the housing.

2. A clutch thrust bearing assembly according to claim 1 wherein each housing has a surface portion which is chamfered in order to facilitate bending of the retaining element when it is inserted into and passes through said passage.

3. A clutch thrust bearing assembly according to claim 1 wherein said axial arm has one end provided with said hook and an opposite end provided with a snap-fastening fold, said snap-fastening fold being constructed to bend when it passes through the radial flange by bending in said passage and then hooking onto an inner face of the radial flange opposite the hook when said edge of the transverse arm contacts the abutment means of the housing.

4. A clutch thrust bearing assembly according to claim 1 wherein each mounting support means of the guide bush has a guide surface for interacting with the operating member.

5. A clutch thrust bearing assembly according to claim 1 wherein the mounting support means are arranged radially in proximity to the tubular part of the guide bush.

6. A clutch thrust bearing assembly according to claim 1 wherein the mounting support means are arranged in proximity to the outer periphery of the radial flange.

* * * * *